March 15, 1960   M. L. FOUASSIN   2,929,007
ELECTRIC REMOTE CONTROLLED POSITIONING SYSTEM
Filed Jan. 7, 1957   6 Sheets-Sheet 1

INVENTOR.
MARCEL L. FOUASSIN

BY *Fredric B. Schramm*

ATTORNEY

March 15, 1960  M. L. FOUASSIN  2,929,007
ELECTRIC REMOTE CONTROLLED POSITIONING SYSTEM
Filed Jan. 7, 1957  6 Sheets-Sheet 3

INVENTOR.
MARCEL L. FOUASSIN
BY
ATTORNEY.

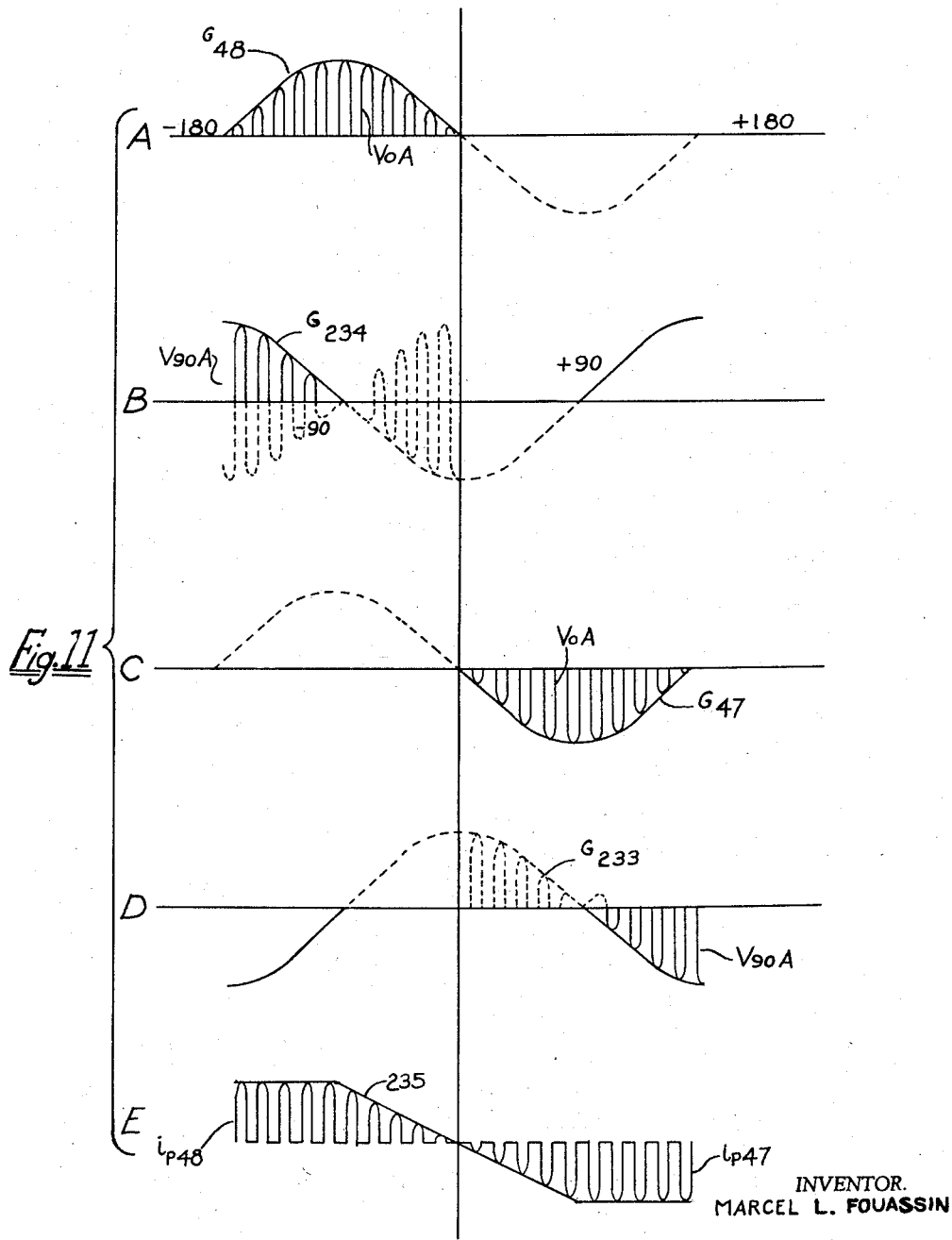

United States Patent Office 2,929,007
Patented Mar. 15, 1960

2,929,007

ELECTRIC REMOTE CONTROLLED POSITIONING SYSTEM

Marcel Louis Fouassin, Liege, Belgium, assignor to Ateliers de Constructions Electriques de Charleroi, Brussels, Belgium, a company of Belgium Application January 7, 1957, Serial No. 632,904

8 Claims. (Cl. 318—30)

This application is a continuation-in-part of my copending applications Serial No. 352,472 filed May 1, 1953. In my original patent application 352,472 now U.S. Patent No. 2,783,422 I have described an electric remote-controlled positioning system for very accurate adjustment of heavy machines by means of relatively light apparatus, for example a keyboard having ten push-buttons arranged in decimal relation.

In said application and patent, and in the divisional application Serial No. 638,668, now Patent No. 2,898,541, there is described a preset servo system which includes only one synchro repeater or selsyn unit (the "load" unit) together with a transformer and operative connections between the unit and the transformer and including a discriminator energized responsive to supervisory (e.g., pushbutton) control from the transformer, an amplifier fed from the discriminator, and a servomotor energized by the selsyn which then correspondingly affects the transformer. In the parent and divisional cases there is described, in connection with a Fig. 15 therein, a flat response discriminator having first triodes with the grids connected to an input signal provided by supervisory control of transformer and biased to cut-off plate current until there is an error angle, and second stage triodes biased to cut-off and fed from the first stage, with rectifier means to provide a D.C. output to feed grids of triodes in the amplifier.

An object of the present invention is to provide simple and inexpensive means for very rapid positioning within a wide angular range, giving a preset servo system a linear response over the widest possible limit, that is, making the signal of a preset servo system having but one selsyn proportional to the angular difference or error between the actual position of the load and the selected or imposed position.

In my aforesaid applications I have already pointed out that it is advantageous to make placements by the use of a "coarse" channel at the maximum speed possible, that is, with the amplifier saturated, while at the approach to the selected position a "finer" channel adjusts to the final position at lower speed.

The solution proposed in my aforesaid applications, viz. a flat-response discriminator, as described with reference to a Fig. 15 therein, does not give complete satisfaction when it is required to effect displacements of heavy masses having great inertia. Although the discriminator-amplifier circuit described with reference to Fig. 16 therein gives a response curve decreasing linearly at the approach to the selected position, it has the drawback of offering the same response at the symmetrical position, that is, the same at any angle between +90° and —180° and at the symmetrically located angle between +90° and +180°. For this reason, when the imposed on requisite position differs from the actual position, by a little less than 180° in either sense, the signal given by the discriminator is not a maximum, for it only attains that value when the angular differences or errors are relatively small. This response curve is moreover very unsatisfactory in the case of an intermediate channel, such as described with references to Fig. 20 in my aforesaid application (see curve 102 or 105). On the contrary, the curves 113 show what characteristics should be possessed by the amplifying discriminator of such an intermediate channel, in order to make a smooth transition between the constant-amplitude signal of the upper or coarse-adjustment channel at high speed and the decreasing-amplitude signal of the lower or finer-adjustment channel for slowing down the load and bringing it at decreasing speed to the final position.

The present invention is characterized in that the system is equipped with at least one voltage discriminator of which the response curve is flat between the error angles 180° and $\phi°$, and is drooping between the angles $\phi°$ and the dead zone of zero voltage about the zero angle, the angle $\phi°$ being chosen at will between 180° and 0°.

The invention is hereinafter described with reference to the accompanying drawings, in which:

Fig. 11 is a set of graphs illustrating the principle of operation of the embodiment of Fig. 8.

Figure 1:
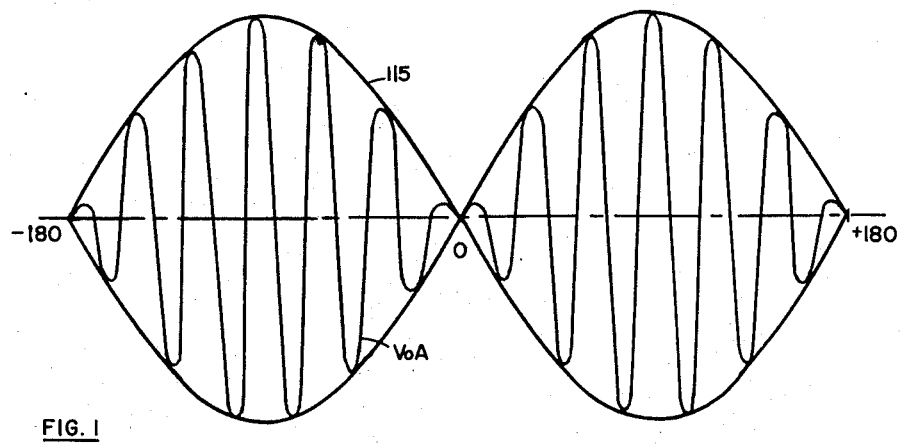
Fig. 1 is a graph of voltage plotted against the angle of difference or error between a selected position and the position occupied by a load and showing an alternating voltage modulated by a sinusoid producing V₀A (voltage, o phase, as applied to discriminator)

In Fig. 1 of the drawings, the signal signifying the angle of difference or error between the actual position of a rotatable load and the position imposed by the selective control element is shown as an alternating voltage V₀A (voltage, p phase applied) modulated by a sinusoid 115, the voltage becoming zero at the difference angles —180°, 0° and +180°. When this signal is applied to a discriminator such as described in my aforesaid application, the discriminator delivers a rectified and clipped voltage 86=Vd (voltage, from discriminator), varying according to the difference angle. Rectified voltages appearing at the output terminals of such a discriminator are shown diagrammatically in Fig. 2, as a discriminator response curve comprising a positive branch for the forward drive of associate apparatus driven by a servomotor and a negative branch for its reverse drive, the two branches being separated from one another by a dead space at 78. The voltage 86 applied to the servomotor will control the speed of displacement of the load. Thus, with a response curve of the form shown in Fig. 2, the speed of the motor will remain substantially constant for all error angles not included in the neutral or dead zone 78, where the motor is not supplied with current.

If the load possesses considerable inertia, as is generally the case, it overshoots the selected position and the system begins to hunt. In order to avoid this drawback, it was proposed in my aforesaid applications to decrease progressively the speed of the load at the approach to the requisite position; one solution described with reference to Fig. 16 therein, was to modulate the slope at the extremities of the response curve 86, giving it drooping portions as in a sinusoidal voltage. But that solution would give rise to a response curve symmetrical with respect to a position distant by 90° from the selected position; in this way, the servomotor would not receive the maximum signal in the vicinity of 180° and the starting of a load distant by nearly 180° from the requisite position would therefore be very slow.

Figure 3:
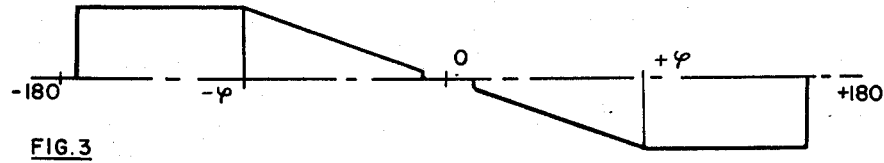
Fig. 3 is a graph similarly of voltage against error angle and showing the ideal condition for the output of a discriminator as is achieved according to the present invention.

By the application of the present invention, the response curve of the discriminator can be given the form illustrated in Fig. 3, the curve being flat over the range from 180° to $\phi°$, and drooping between $\phi°$ and 0° down to a fairly low value. About the angle 0° (this being the position imposed by the selective control device), there exists a dead zone 78 where the voltage is zero, which improves the stability of the system. The angle $\phi°$ can be adjusted to a value such that the linear response of the servomotor mechanism is spread over a sufficiently wide range so that the inertia of the load will allow a progressive stop at the zero position.

The invention can be performed in various ways. For example, one solution is based upon the superposition of different voltages, while another solution can be obtained by suitable switching from one response curve to another by the action of a negative feedback upon the amplifying part of a discriminator.

The signal signifying the difference angle between the position of the load and the position imposed by the selective control device is an alternating voltage modulated by a sinusoid and it gives rise to the envelope curve 115 in Fig. 1, falling to zero at the difference angles −180°, 0° and +180°. This signal is picked up, according to the first way of performing the present invention, and may be conveniently picked up at the terminals of one phase winding of a multiphase transformer as determined by a selective control device with the multiphase transformer itself connected to a synchro-repeater or selsyn, all as described in my aforesaid applications.

Figure 7:
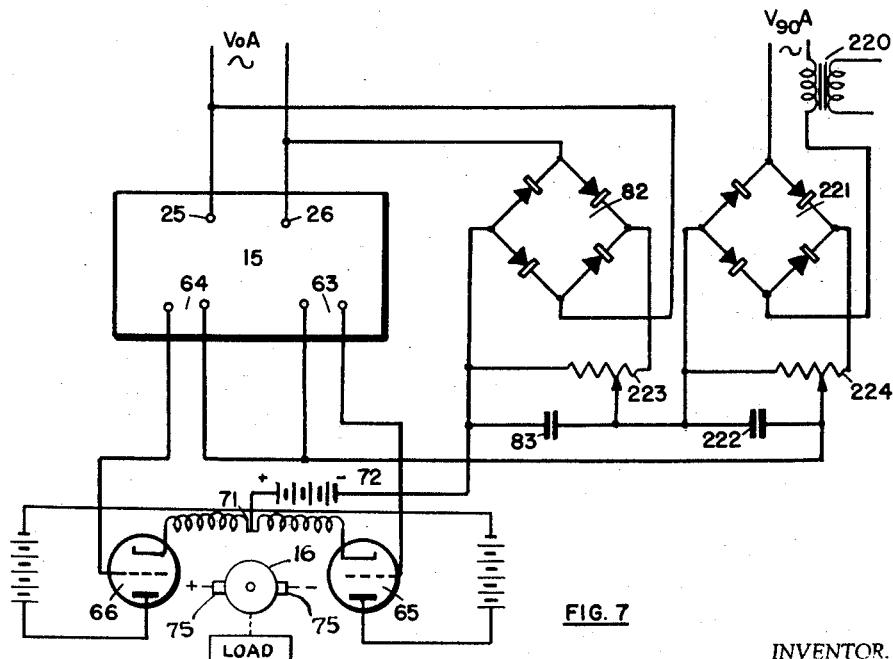
Fig. 7 is a simplified schematic diagram of equipment connections according to the present invention.

Referring next to Fig. 7, and using like reference numbers for like parts as in the prior applications, I have schematically shown a discriminator indicated generally at 15 and having input signal terminals 25 and 26 and output terminals 63 and 64.

A servoamplifier is provided comprising a pair of electric discharge devices 65 and 66, e.g., triodes, each having an anode supply and having a control electrode coupled to one of the output terminals 63—64 of the discriminator 15. The electric discharge devices 65 and 66 also have connections such that the polarity of the output current is determined by whichever of the discriminator output terminals 63 and 64 is energized, and in the specific arrangement shown the amplifier output is taken from the cathodes with a common terminal 71 connected to the positive terminal of a bias voltage source 72.

To obtain a response curve having a dead section such as the area 78 (of Fig. 2 hereof) but with a linear rising characteristic (as in Fig. 3), a source of unidirectional control voltage proportional to the amplitude of the input signal $V_oA$ is supplied to a full wave rectifier 82 (Fig. 7). Output terminals of the rectifier have a filter condenser 83 variably placed thereacross through the intermediary of a voltage divider 223. The negative terminal of the rectifier output is also shown connected to the negative terminal of the bias supply.

Figure 4:
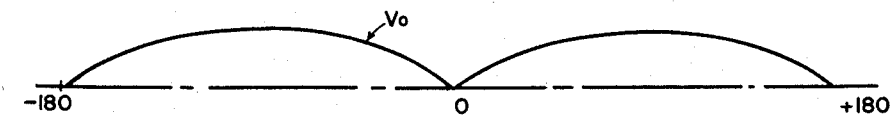
Fig. 4 is a graph of amplifier voltage against error angle and showing a resultant direct current voltage varying with position as a result of equipment according to the present invention.

With the alternating voltage $V_oA$, modulated by the sinusoid 115 (see Fig. 1), rectified as by a rectifier 82 (Fig. 7), the amplitude of the resultant direct-current voltage, as a function of the position of the moving part of the synchronous transmitter, will be given by the curve $V_o$ (Fig. 4), this voltage appearing at the terminals of condenser 83.

Figure 5A:
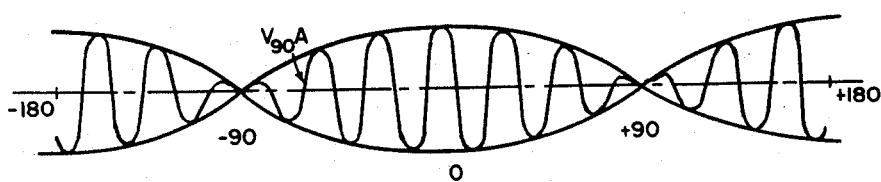
Fig. 5a is a graph of voltage against error angle representing a voltage $V_{90}A$ which compared to that of Fig. 1 is shifted in space 90° due to use of transformer phase arrangements as described in the aforesaid applications.
Figure 12:
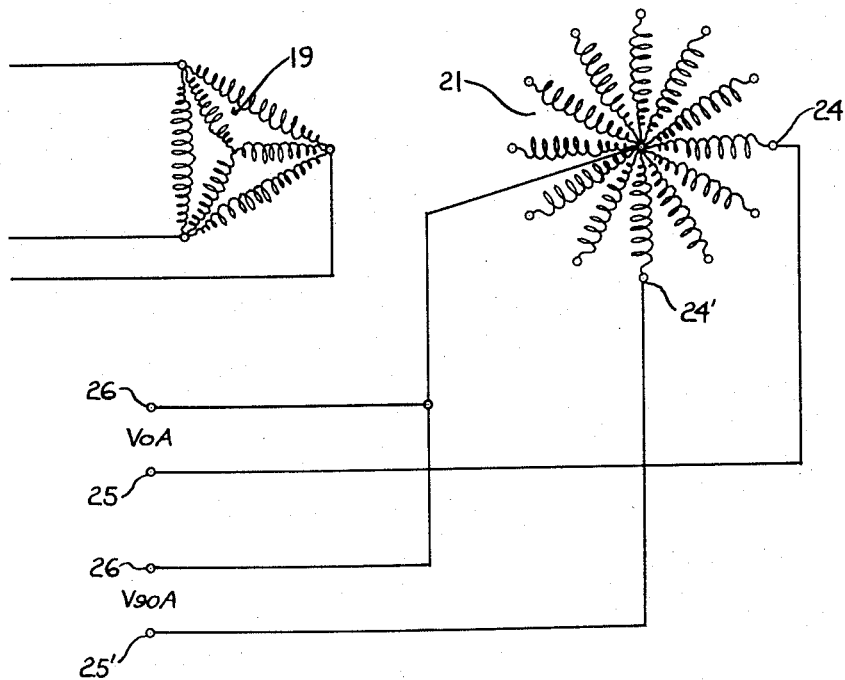
Fig. 12 is a diagram illustrating a method of obtaining voltage in space quadrature.

In my aforesaid application in conjunction with Fig. 7 thereof, I have described a type of multiphase transformer in which to each phase $a, b, c, \ldots$ there corresponds likewise a phase $a', b', c', \ldots$ of which the voltages are shifted in space by 90°, that is to say that if the signal picked up from the phase $a$ falls to zero for the positions −180°, 0° and +180° of the moving part of the synchronous transmitter, the voltage $V_{90}A$ of the phase $a'$ falls to zero at −270°, −90° and +270°, of which only −90° and +90° are shown in Fig. 5a. This is illustrated in Fig. 12 corresponding to Fig. 7 of my parent application considered in conjunction with Figs. 1 and 4 thereof. Voltages $V_oA$ and $V_{90}A$ in space quadrature are derived from the multiphase secondary winding 21 by tapping points 24 and 24′, which are 90 mechanical degrees apart. A conventional delta-star connected primary winding 19 with corresponding secondary windings is shown for simplicity to illustrate the principle in lieu of the connections shown in Figs. 3, 4, 7 and 9 of the parent application for obtaining finer divisions of space angle.

Figure 5B:
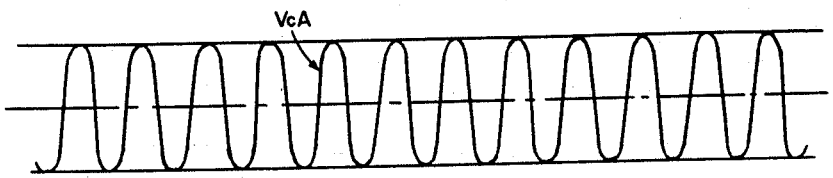
Fig. 5b is a graph of a voltage constantly alternating (VcA) and produced by a transformer.
Figure 6:
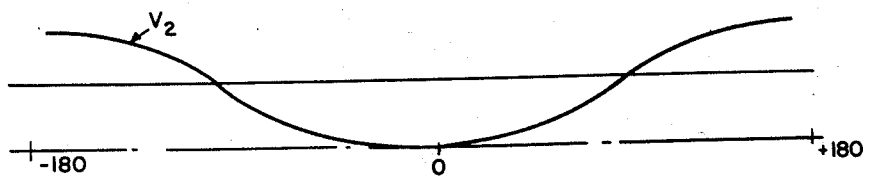
Fig. 6 is a graph of the resultant of the addition of curves of Figs. 5b and 6, plus rectification as produced by equipment shown in Fig. 7.
Figure 9:
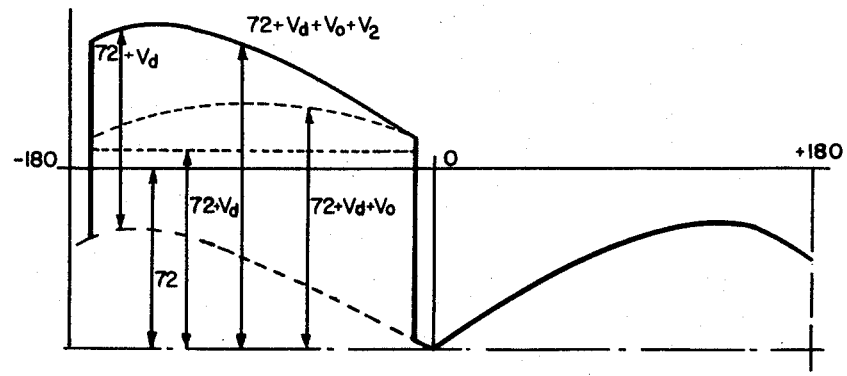
Fig. 9 is a graph of input voltages against angle to illustrate the principle of operation of a system connected as in Figs. 7 and 8.

If, now, there is superposed on this voltage $V_{90}A$ a constant voltage $V_cA$, such as shown in Fig. 5b, furnished by a transformer 220 (Fig. 7) and having a maximum amplitude equal to $V_{90}A$, there will be obtained a resultant voltage of $V_{90}A+V_cA$. This resultant voltage is rectified by a rectifier 221 (Fig. 7). Output terminals of the rectifier have a filter condenser 222 variably placed thereacross through the intermediary of a voltage divider 224, the negative output of this arrangement is connected to the positive side of the other arrangement (82, 83, 223) and the positive side of the 221, 222, 224 arrangement is taken back to the output of the discriminator 15 to place both arrangements in series therewith. The resultant voltage from $V_{90}A+V_cA$ (from 220) as rectified and appearing across the condenser 222 will have its value as a function of the position of the moving part of the synchro repeater being given by the envelope curve V2 shown in Fig. 6.

Figure 2:
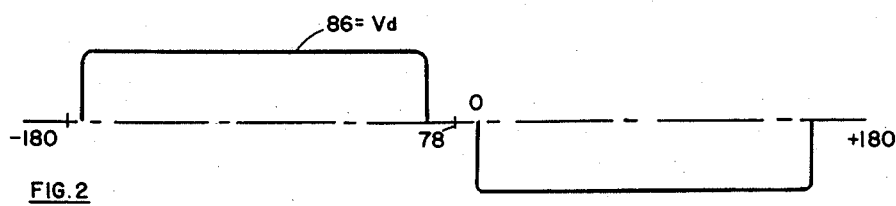
Fig. 2 is a graph of voltage against error angle showing the output of a suitable discriminator.

If the voltage $V_oA$ alone were applied to a discriminator 15, such as shown in Fig. 7 and described for example with reference to Fig. 15 of my aforesaid applications, the discriminator would deliver at its output terminals a rectified and clipped voltage 86, equal to $Vd$, such as shown in Fig. 2; this voltage, symmetrical with respect to the positions −90° and +90°, would appear either at the terminals 63 or at the terminals 64 (Fig. 7), according to the sign of the difference or error between the actual position of the load and the selected position.

As shown in Fig. 7, the discriminator 15 of my parent explanation controls a servo-amplifier comprising tubes 65 and 66 which in turn control the speed and direction of the servomotor 16. For simplicity in Fig. 7 the motor 16 is shown as of a differentially connected double field type with opposing field windings 68 and 69 connected in series with tubes 65 and 66, respectively. It will be understood, however, that preferably an amplidyne dynamo-electro amplifier 67 is interposed in the system as illustrated in Fig. 15 of my parent application.

In order to render this output voltage $Vd$ suitable for achieving the object of the present invention, that is, to give it the form shown in Fig. 3, this voltage has superposed thereon the two other voltages Vo (Fig. 4) and V2 (Fig. 6), which appear at the terminals of the condensers 83 and 222 respectively. The voltages Vo and V2 are added to the voltage Vd and applied together with the grid bias voltage 72 between the common cathode connection 71 and the grids of the tubes 65 and 66. The form of the resultant voltage is given in Fig. 9, wherein the dotted line 72+Vd represents the voltage appearing for example at the terminals 64, and the dotted line 72+Vd+Vo represents the voltage which would be applied to the tube 66, if the potentiometer 224 were set at zero. The line 72+Vd+Vo+V2 is the voltage applied to the grid of the tube 66, when the potentiometers are set at full value. In fact, saturation of the amplifier tubes produces a clipping of the output curve in such a manner that the response characteristic of the amplifier current has the form of the curve in Fig. 3. Moreover, the grid-bias voltage 72 is chosen sufficiently high in the negative sense to polarize completely the portion of the amplifier which controls inverse movement in the particular instance; for forward movement, the voltage at the terminals 64 will operate the tube 66, while the voltage at the terminals 63 will polarize the tube 65. In fact, although there does not appear on this side of the discriminator any control voltage Vd, nevertheless there are added in this branch of the amplifier positive voltages Vo and V2 which could produce currents in the tube if the grid thereof did not remain polarized beyond the "cut-off."

Figure 8:
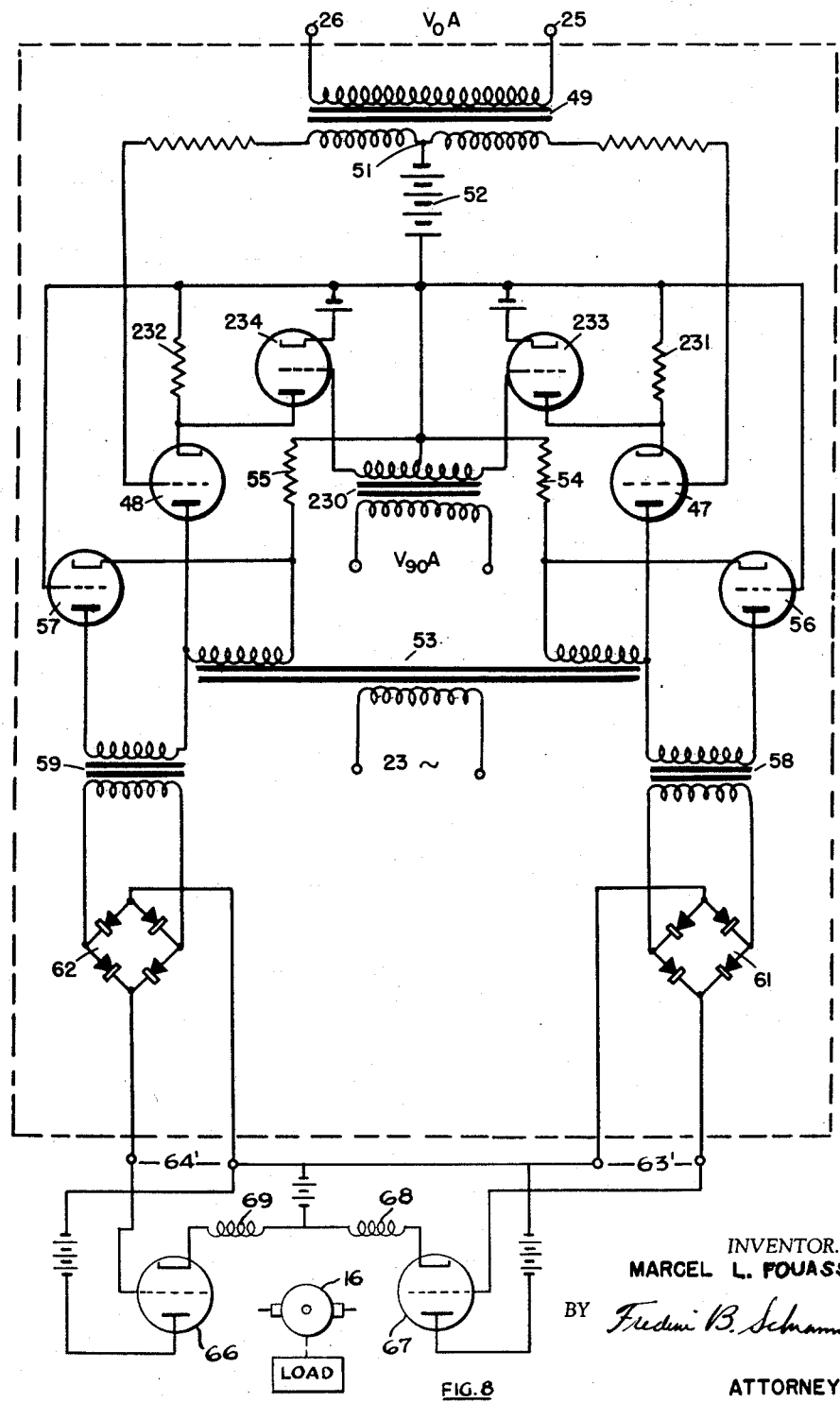
Fig. 8 is a simplified schematic diagram of a modification.

According to another solution represented in Fig. 8, the voltage discriminator described with reference to Fig. 15 in each aforesaid application is modified. Applying like numbers to like parts, as before, there is shown in Fig. 8 of the present application, a discriminator having a pair of push-pull connected triodes 47 and 48 having input control electrodes coupled to the input signal terminals 25 and 26 with opposite polarities by a conventional coupling transformer 49 with secondary mid-tap 51. The signal voltage VoA is applied to the terminals 25 and 26 of the transformer 49. The mid-tap 21 is connected by the intermediary of a grid-bias voltage source 52 to the cathodes of the tubes 47 and 48 through negative feedback resistances 231 and 232 respectively. The plates of the tubes 47 and 48 are fed by a power transformer 53 having a double secondary winding fed by a constant alternating voltage 23. The current rectified by the tubes 47 and 48 appears at the terminals of one of two cathode follower or load resistances 54 and 55 arranged in circuits each connecting the anode to the cathode of the same tube. When the tubes 47 and 48 are fed through the cathode resistances 231 and 232, they operate, at least to a great extent, as amplifying discriminators with linear amplification. Further amplification may be derived through second stage triodes 56 and 57 with control electrode connections to a common point which is the center tap of the secondary of transformer 230. The output from triodes 56 and 57 passes through coupling transformers 58, 59, and full wave rectifiers 61, 62, so that an output signal will appear at terminals 63 or 64. If additional means such as tubes 234 and 233 (as hereafter described) were not provided, the rectified voltage picked up at the terminals 63' and 64' would be proportional to the signal input voltage, and have the form of a sinusoid or a slightly clipped sinusoid, proportional to the angular difference or error. This is due to the high negative feedback by the cathode resistances 231 and 232. In this case, the discriminator would possess a drooping characteristic between 90° of angular difference and the zero position.

Considering now the effects due to the presence of the tubes 234, 233 which are arranged around resistances 232, 231 to effect feedback proportional to a $V_{90}A$ signal applied to a transformer 230, and assuming that tubes 234, 233 became conductive with internal resistances negligible in comparison with the resistances 231, 232, the tubes 47, 48 would then operate without appreciable negative feedback and would quickly become saturated, in such a way that the voltages picked up at the terminals of the resistances 55, 54 would be constant and independent of the signal voltage. In this case, the alternating voltage furnished to the transformers 58, 59, and consequently that at the terminals 63, 64, would be substantially constant, the voltage from the rectifiers 61, 62 being substantially constant once the difference or error had exceeded a relatively low value. The discriminator would therefore possess a flat characteristic in this case.

In order to produce a first mode of operation between −90°, 0° and +90°, and a second mode from −180° to −90° and from +90° to +180°, the tubes 233, 234 are controlled by the voltage $V_{90}A$ shifted in space by 90° with respect to the signal voltage VoA. This voltage $V_{90}A$ is led to the grids of the tubes 233, 234 through the transformer 230.

Fig. 5a shows the envelope curve of the voltage $V_{90}A$ as a function of the difference angle or error. If it is compared with the envelope curve of the main signal, it will be seen that the voltages 115 (Fig. 1) and $V_{90}A$ (Fig. 5a) are simultaneously of the same sign during the displacements from −180° to −90° and from +90° to 180°, whereas they are of opposite sign between −90° and +90°. The grids of the Fig. 8 tubes 48, 234 and 47, 233 are therefore never of the same sign at the same time between −90° and +90°, while the tubes 234, 233 have a high resistance, and are therefore unable to short-circuit the negative feedback voltages which appear at the cathodes due to the resistances 232, 231. At this time, the tubes 47, 48 operate as linear amplifiers, at least for the greater part of the signal. The voltages which appear across the resistances 55, 54 are amplified by the tubes 56, 57, and applied to the transformers 58, 59, being then rectified by the rectifiers 61, 62. On the contrary, from −180° to −90° and from +180° to +90°, the grid voltage of the tubes 48, 234 and 47, 233 are simultaneously of the same sign, which renders the characteristic flat.

Thus a switch-over from the flat characteristic to the drooping characteristic is effected in the viciniy of the angle 90° with respect to the imposed or selected position (0°). The response curve possesses on either side of the zero angle position a drooping characteristic between the difference angles 0° and 90°, and a flat characteristic between 90° and 180°, thus approaching very closely to the ideal curve shown in Fig. 3.

The action is illustrated by Fig. 11, showing how the voltages of the grids of the tubes 233 and 47 remain out of phase for error angles between −90° and +90°, whereas they remain in phase for error angles between −180° and −90° and between +90 and +180, likewise for tubes 234 and 48.

Figure 10:
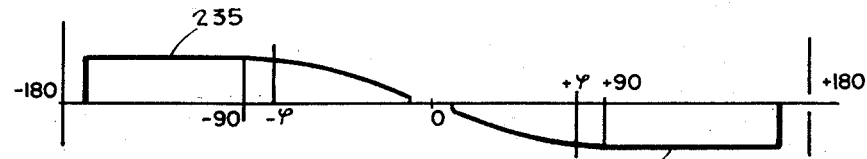
Fig. 10 is a graph of amplifier output voltage against error angle to illustrate the principle of operation of a system connected as in Figs. 7 and 8.

When the voltage on the grids of the tubes 233 and 234 is positive (Fig. 8), the resistances 231 and 234 are short circuited and the curve envelope of Fig. 10 is illustrated by the flat part 235. At the 90° point the voltage on the grids of tubes 233 and 234 becomes negative, the tubes becoming non-conducting. The current then passes through the resistances 231 and 232, creating thus a counter-effect which acts on the polarization in such a manner that the tubes function as a linear amplifier, at least for the greater part of the modulated signal. If the apex of the envelope curve of the signal VoA amplified by the tubes 47, 48 or 56, 57 is cut off, the flat part 235 of the envelope curve is prolonged beyond 90° up to $\phi$°, for example.

In Fig. 11 the envelope of the voltage VoA applied to the grid of the tube 48 is represented by the curve $G_{48}$, only the positive halves of the oscillation $V_oA$ being effective owing to the fact that the tubes are biased to cut off by the C-battery 52. To illustrate the action the oscillations at the frequency of the source 23 are plotted to a time base although the envelopes are plotted to an error-angle base. The envelope of the sinusoidal voltage $V_{90}A$ applied to the grid of the tube 234 is represented by the curve $G_{234}$. Since this tube also is biased to cut-off, it remains non-conducting until the error angle exceeds −90° or +90° at which point the phase of the voltage $V_{90}A$ reverses as illustrated and the positive half-cycles of the voltage $V_{90}A$ become effective to produce the positive portions of the envelope $G_{234}$ shown in full lines, ineffective portions of the waves being shown in dashed lines. It will be observed that from −90° to −180° the oscillations $V_A$ and $V_{90}A$ are in phase, whereas for error angles under 90° they are in opposition. Since the voltage source 23 applied to the repeater 12 of my parent application is a single phase source, only 0 and 180° time phase relations are possible. The tube 234 then short circuits the cathode resistance 232 of the tube 48 and it saturates to produce the flat portion of the envelope of cathode current positive half-cycles $i_p48$.

For positive error angles only the tubes 47 and 233 conduct, the corresponding curves $i_p47$, $G_{47}$, and $G_{233}$ being shown inverted because the cathode circuits of the tubes 47 and 48 are connected in opposition with the conducting half-cycles below the base line instead of above.

These examples have been given by way of illustration and without limitation of the invention thereto; it is not absolutely necessary that the switch-over shall take place at the angular difference of 90°, or that the auxiliary voltage shall be exactly shifted by 90°. That value has been chosen for the two examples because it facilitates the explanations and gives in practice the best results; the angle $\phi°$ may be chosen at will between 180° and 0°, according to circumstances. The principles embodied in the first device described can be applied to the control of magnetic amplifiers, with the difference that the rectified voltages $Vo$, $Vd$ and $V2$ can be added together or superposed in the magnet windings, which, in the case of magnetic amplifiers, may be separate.

What is claimed is:

1. The combination of a discriminator amplifier circuit responsive to a first signal of angular error applied thereto and which in normal operation provides a clipped but otherwise flat response of voltage with respect to error angle due to saturation and including means connected to receive said first error signal and apply it to the discriminator, means for deriving an additional error signal out of phase with the first, means for deriving an alternating current voltage of constant value, and means for applying the rectified sum of first error signal, second error signal, and the alternating current voltage of constant value to linearly weaken the normally flat response when said first error signal results from less than a predetermined angular amplitude and thus less than the angular amplitudes which thereafter in normal operation cause saturation.

2. In a remote positioning system for rotatable positioning of a load, the combination of a discriminator for clipping a sine modulated error response to produce a substantially flat response voltage between a dead zone at 0° and 180° angle of difference between the load and a predetermined angular setting called for, first input conductors for carrying the sine modulated response to the discriminator, output conductors for taking the flat response voltage from the discriminator, and means for affecting the discriminator response additionally to the normal effect of input and discriminator, said means comprising additional input conductors which introduce voltages causing the response voltage from the discriminator-amplifier combination to droop linearly towards the zero position when the angle of difference between the load and the setting called for is less than a predetermined angle, less than 180°; whereby the response curve will be flat from 180° to said angle and drooping between said angle and the dead zone about the zero angle to provide accurate positioning of loads of large inertia.

3. In a remote positioning system, the combination as in claim 2 further characterized by the first input conductors and at least some of the additional input conductors being from different phases tapped off a multiphase transformer.

4. In a remote positioning system the combination as in claim 2, further characterized by the means for affecting the discriminator response comprising input conductors which introduce a component voltage in phase with the angle of error, input conductors which introduce a component voltage shifted in space 90° with respect to the error angle signal, and input conductors which introduce a constant alternating voltage of value equal to the maximum amplitude of the 90° out of phase voltage, so as to form a resultant output of which the amplitude is maximum adjacent an error angle of 180°, but symmetrically and linearly drops to zero adjacent the zero position to form a characteristic symmetrical with respect to said zero position.

5. In a remote positioning system for rotatable positioning of a load, the combination as in claim 2, further characterized by the discriminator having a pair of electric discharge devices with input signal means for applying signals of opposite polarity to the electric discharge devices, means for providing negative feedback to each of said electric discharge devices, and still further characterized by the means for affecting the discriminator response additionally to the normal affect of input comprising connections for modifying the value of negative feedback to obtain a response quasi-proportional to the amplitude of the error signal from a predetermined angle $\phi$ to approximately zero, and from approximately 180° to $\phi$ a saturation which renders output amplitude independent of input signal amplitude.

6. In a remote positioning system of the type having a discriminator-amplifier combination for energizing a servomotor to drive a load angularly to a pre-selected position determined by a selector, the combination of first connections arranged to provide to the discriminator a first alternating voltage modulated in accordance with angular difference between the pre-selected position and the servo driven load and reaching 0 as the angular difference reaches 0, second connections arranged to provide a second alternating voltage also modulated in accordance with angular difference between the pre-selected position and the servo driven load, but differing in phase so that the voltage reaches a maximum as the angular difference reaches 0, third connections arranged to provide a third alternating voltage which is a constant alternating voltage, and means including connections for rectifying the first voltage to produce a voltage $Vo$, means including connections for adding the second and third voltages and rectifying the sum thereof to produce a voltage $V2$ varying in a direct current sense from a maximum adjacent 180° angle of difference to zero adjacent 0 angle of difference, and means including connections for adding the voltage $V2$ to the voltage $Vo$ and applying the sum thereof to the amplifier additionally to the effect of the discriminator to provide rapid positioning of loads having large inertia.

7. In a controlled positioning system having a discriminator amplifier combination for supplying a voltage clipped to zero at, and near, zero degrees of angular difference between the position of apparatus to be positioned and a position predetermined by remote control, means for applying to the discriminator an alternating voltage modulated by the angular difference, means for additionally applying to the discriminator-amplifier combination an alternating voltage modulated by the angular difference but shifted in phase with respect to the first mentioned voltage, and means for still additionally applying to the discriminator-amplifier combination a voltage of constant alternating value, whereby the total response may be flat between substantially 180° and $\phi$ and linearly drooping betwen $\phi°$ and substantially 0°, and hunting obviated.

8. The combination of a discriminator amplifier circuit responsive to a first signal of angular error applied thereto and which in normal operation provides a clipped but otherwise flat response of voltage with respect to error angle due to saturation and including means connected to receive said first error signal and apply it to the discriminator, means for deriving an additional error signal out of phase with the first, means for producing from said additional error signal an effect to which the discriminator amplifier circuit may be rendered responsive in conjunction with the said first signal of angular error, and means for operatively applying said effect to said circuit to weaken the normally flat response linearly when said first error signal results from less than a predetermined angular amplitude and thus less than the angular amplitudes which thereafter in normal operation cause saturation.

References Cited in the file of this patent
UNITED STATES PATENTS

| | | |
|---|---|---|
| 2,389,692 | Sherwin | Nov. 27, 1945 |
| 2,434,259 | Burton | Jan. 13, 1948 |
| 2,632,872 | Washer | Mar. 24, 1953 |
| 2,783,422 | Fouassin | Feb. 26, 1957 |